United States Patent
Priel et al.

(10) Patent No.: US 8,223,910 B2
(45) Date of Patent: Jul. 17, 2012

(54) METHOD AND DEVICE FOR FRAME SYNCHRONIZATION

(75) Inventors: Michael Priel, Hertzlia (IL); Christopher K. Y. Chun, Austin, TX (US); Gordon P. Lee, Gilbert, AZ (US); Cor Voorwinden, Toulouse (NL)

(73) Assignee: Freescale Semiconductor, Inc., Austin, TX (US)

( * ) Notice: Subject to any disclaimer, the term of this patent is extended or adjusted under 35 U.S.C. 154(b) by 780 days.

(21) Appl. No.: 11/917,111

(22) PCT Filed: Jun. 10, 2005

(86) PCT No.: PCT/EP2005/007885
§ 371 (c)(1),
(2), (4) Date: Jul. 18, 2008

(87) PCT Pub. No.: WO2006/131142
PCT Pub. Date: Dec. 14, 2006

(65) Prior Publication Data
US 2009/0175393 A1    Jul. 9, 2009

(51) Int. Cl.
*H04L 7/00* (2006.01)
(52) U.S. Cl. ........ 375/357; 375/354; 713/322; 395/325; 395/750; 395/287
(58) Field of Classification Search .................. 375/357, 375/354; 713/322; 395/325, 750, 287
See application file for complete search history.

(56) References Cited

U.S. PATENT DOCUMENTS

| 4,584,643 | A | * | 4/1986 | Halpern et al. ............... 709/248 |
| 5,457,786 | A | | 10/1995 | Roush |
| 5,467,042 | A | | 11/1995 | Smith et al. |
| 5,499,242 | A | | 3/1996 | Lee et al. |
| 5,628,019 | A | | 5/1997 | O'Brien |
| 5,652,895 | A | | 7/1997 | Poisner |
| 5,767,701 | A | | 6/1998 | Choy et al. |
| 6,014,751 | A | | 1/2000 | Kardach et al. |
| 6,085,330 | A | | 7/2000 | Hewitt |
| 6,092,138 | A | | 7/2000 | Schutte |
| 6,131,167 | A | | 10/2000 | Cruz |
| 6,163,848 | A | * | 12/2000 | Gephardt et al. ............. 713/322 |
| 6,404,780 | B1 | | 6/2002 | Laturell et al. |
| 6,483,847 | B1 | | 11/2002 | Ross |
| 6,675,305 | B1 | | 1/2004 | Mohammad |

(Continued)

FOREIGN PATENT DOCUMENTS

EP    0996068 A2    4/2000

(Continued)

OTHER PUBLICATIONS

"Fibre Channel PCI/PMC Interfaces," printed on Dec. 29, 2010 from <http://hsi.web.cern.eh/HSI/fcs/process/pci.htm>, 8 pages.

(Continued)

*Primary Examiner* — Siu Lee

(57) ABSTRACT

A device and a method for frame synchronization, the method includes providing a high frequency clock signal over a clock line during a transmission of information over a data line connected to a media access controller and to at least one component; defining a short synchronization period; processing at least one signal conveyed over the data line during the short synchronization period to determine a presence of a synchronization error; and maintaining at least the clock line in a low power mode when the data line is substantially idle.

21 Claims, 7 Drawing Sheets

U.S. PATENT DOCUMENTS

| | | | |
|---|---|---|---|
| 6,697,884 | B1 | 2/2004 | Katsch |
| 7,039,736 | B2 | 5/2006 | Mantey et al. |
| 7,155,631 | B2 * | 12/2006 | Kiriake .................. 713/600 |
| 7,523,245 | B1 | 4/2009 | Williams et al. |
| 2001/0038277 | A1 | 11/2001 | Burstein et al. |
| 2002/0000797 | A1 | 1/2002 | Schultz et al. |
| 2003/0090939 | A1 | 5/2003 | Perroni et al. |
| 2003/0202472 | A1 * | 10/2003 | Kalkunte et al. ............ 370/235 |
| 2004/0025068 | A1 | 2/2004 | Gary et al. |
| 2004/0049611 | A1 | 3/2004 | Kotlow et al. |
| 2004/0049619 | A1 | 3/2004 | Lin |
| 2004/0052098 | A1 | 3/2004 | Burstein et al. |
| 2004/0148446 | A1 | 7/2004 | Katsch |
| 2004/0193880 | A1 | 9/2004 | Walmsley |
| 2004/0252668 | A1 | 12/2004 | Ozukturk |
| 2005/0047334 | A1 | 3/2005 | Paul et al. |
| 2005/0125709 | A1 * | 6/2005 | McKim et al. ................ 714/25 |
| 2006/0140172 | A1 * | 6/2006 | Trainin ....................... 370/352 |
| 2008/0313479 | A1 | 12/2008 | Priel et al. |

FOREIGN PATENT DOCUMENTS

| | | |
|---|---|---|
| EP | 1081601 A2 | 3/2001 |
| JP | 2001274862 | 10/2001 |
| JP | 2004310401 A | 11/2004 |

OTHER PUBLICATIONS

"Netzer AqBiSS Electric Encoders: AqBiSS universal fully digital interface," Application Note (AN-101-00), Netzer Precision Motion Sensors Ltd., 2003, 25 pages.

"I2C-Bus Specification version 2.1," Jan. 2000, <<http://www.nxp.com/acrobat_download2/literature/9398/39340011.pdf>>, document order No. 9398-393-40011, 46 pages.

"PMBus Power System Management Protocol Specification: Part I—General Requirements, Transport and Electrical Interface," Revision 1.0, Mar. 28, 2005,<<http://pmbus.org/docs/PMBus_Specification_Part_I_Rev_1_0_20050324. pdf>>, 17 pages.

"PMBus Power System Management Protocol Specification: Part II—Command Language," Revision 1.0, Mar. 28, 2005,<<http://pmbus.org/docs/PMBus_Specification_PartII_Rev_1_0_20050328.pdf>>, 81 pages.

"System Management Bus Specification," revision 1.1, Dec. 11, 1998, SBS Implementers Forum, <<http://smbus.org/specs/>>, 39 pages.

"PowerWise Adaptive Voltage Scaling (AVS)," National Semiconductor, printed from <<http://www.national.com/analog/powerwise/avs_overview>> on Jan. 5, 2011, 3 pages.

"PWI Open Standard for Next-Generation Power Management," National Semiconductor and ARM Limited, printed from <<http://www.national.com/appinfo/power/files/PWI_Standard.pdf>> on Jan. 5, 2011, 2 pages.

Non-Final Office Action mailed Oct. 5, 2010 for U.S. Appl. No. 11/917,108, 12 pages.

Final Office Action mailed Apr. 1, 2011 for U.S. Appl. No. 11/917,108, 14 pages.

"User Manual: IP BiSerial BA4, Bidirectional Serial Data Interface IP Module," Dynamic Engineering, Ben Lomond, CA, 11 pages, printed from <<http://www.dyneng.com/IPBiS_BA4_man.pdf>> on Oct. 18, 2011.

* cited by examiner

METHOD AND DEVICE FOR FRAME SYNCHRONIZATION

FIELD OF THE INVENTION

The present invention relates to a device and a method for frame synchronization and especially for power efficient method and device for frame synchroinzation.

BACKGROUND OF THE INVENTION

The complexity of integrated circuits has dramatically increased during the last decade. System-on-chip and other multiple-core integrated circuits are being developed in order to support various applications such as but not limited to multi-media applications, real time applications and the like.

Various protocols and buses were developed for exchanging information between semiconductor components. They include, for example, the I²C serial communication protocol, the Serial Peripheral Interface (SPI) serial communication protocol, and the PowerWise™ serial communication protocol.

The following patents and patent applications, all being incorporated herein by reference, provide a brief overview of various devices and method for exchanging information: U.S. Pat. No. 6,483,847 of Ross, titled "Arbitration scheme for a serial interface"; U.S. patent application publication number 20040049619 of Lin, titled "One wire serial communication protocol method and circuit"; U.S. patent application publication number 20040049611 of Kotlow et al., titled "Flexible port configuration and method"; U.S. patent application publication number 20040148446 and U.S. Pat. No. 6,697,884 of Katsch titled "Communication protocol for serial peripheral devices"; and U.S. patent application publication number 20030090939 of Perroni, et al. titled "Nonvolatile memory device with parallel and serial functioning mode and selectable communication protocol".

Many power management schemes are being developed in order to reduce the power consumption of modern integrated circuits. These include, for example, clock frequency reduction, dynamic voltage scaling (DVS), dynamic body biasing, dynamic threshold scaling, adaptive body biasing, and the like.

The following patents and patent applications, all being incorporated herein by reference, provide a brief overview of various power management schemes: U.S. patent application 20040052098 of Burstein et al., titled "digital voltage using current control"; U.S. patent application 20030139927 of Gabara, et al., titled "Block processing in a maximum a posteriori processor for reduced power consumption"; U.S. patent application 20020000797 of Burstein et al., titled "Switching regulator with capacitance near load"; U.S. patent application 20040025068 of Gary et al., titled "Methodology for coordinating and tuning application power" and U.S. patent application 20010038277 of Burstein et al., titled "Digital voltage regulator using current control".

When multiple components share the same medium there is a need to prevent collisions. Collisions can occur when two devices starts to transmit over the line substantially simultaneously.

Collision detection schemes are relatively power consuming as they allow a collision to occur and then try to reschedule another transmission.

There is a need to provide an efficient device and method for frame synchronization.

SUMMARY OF THE PRESENT INVENTION

A device and a method for frame synchronization, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

Figure 1:
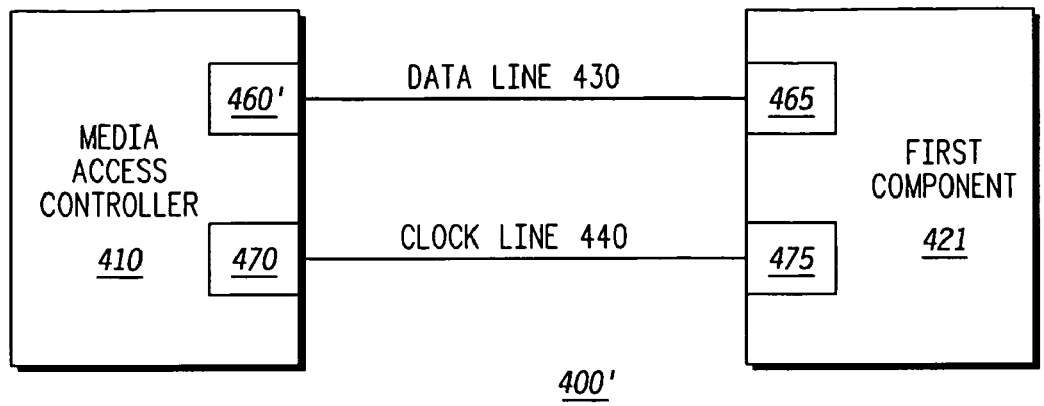
FIG. 1 illustrates a device according to an embodiment of the invention.

FIG. 1 illustrates a device 400' according to an embodiment of the invention. Device 400' includes one or more integrated circuits but can also include additional components such as but not limited to a keypad, a display, microphones, and the like. Device 400 can be a mobile device such as a cellular phone, personal data accessory, a laptop computer, a palm computer, a game console, and the like. Device 400' can also be a non-mobile device such a desktop computer, a work station, a server, and the like.

Device 400' includes a first component 421 and a media access controller 410. The media access controller 410 is connected to the first component 421 by a data line 430 and a clock line 440. The media access controller 410 conveniently provides a clock signal to the clock line 440 during certain periods. The media access controller 410 does not provide any clock signal to the clock line 440 during other periods.

The media access controller 410 can transmit and receive information over the data line 430.

Conveniently, the media access controller 410 provides high frequency clock signals over the clock line 440 even during a reception of data over the data line 430. Conveniently, the media access controller 410 can operate as a data transfer slave, while providing the high frequency clock signals over the clock line 440. Thus, if the media access controller 410 granted access to a certain component, the media access controller 410 provides the clock signals during the transmission of data by the component, even if the media access controller is the destination of the data.

Figure 3:
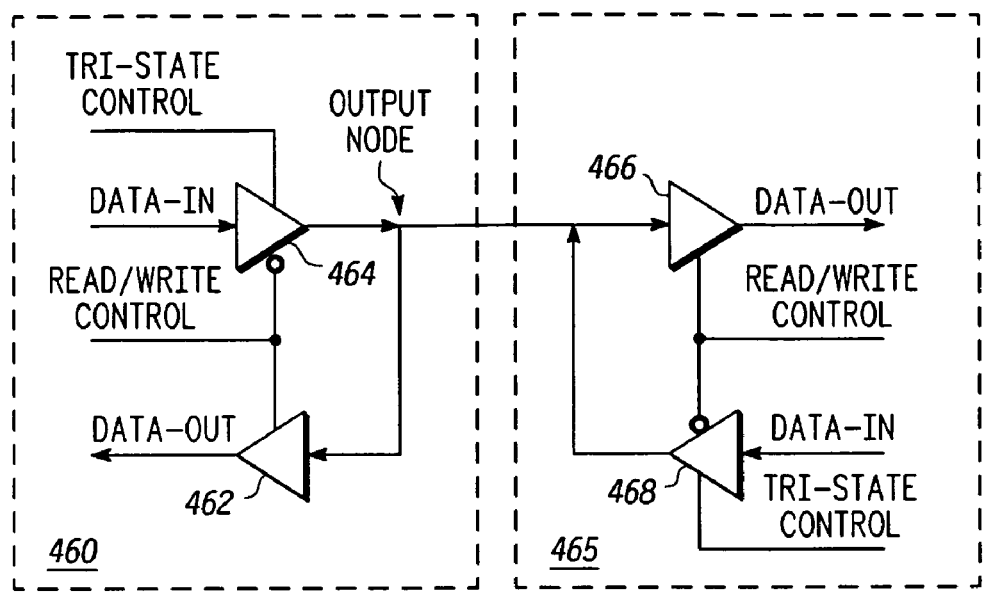
FIG. 3 illustrates data line interfaces of master and slave components, according to an embodiment of the invention.
Figure 4:
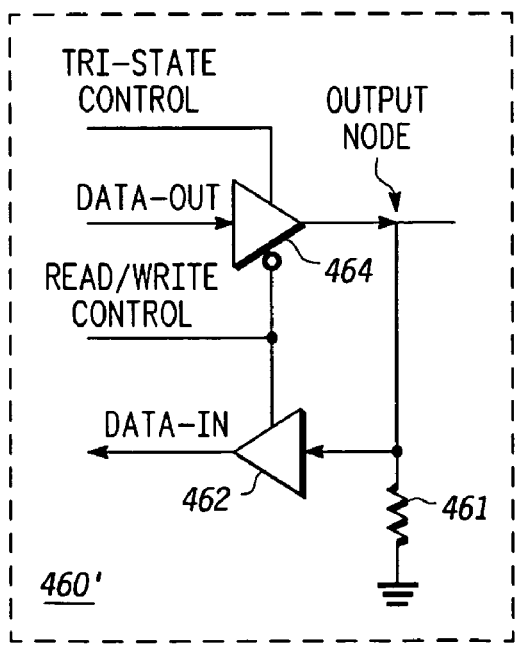
FIG. 4 illustrates a data line interface of a media access controller, according to an embodiment of the invention.
Figure 5:
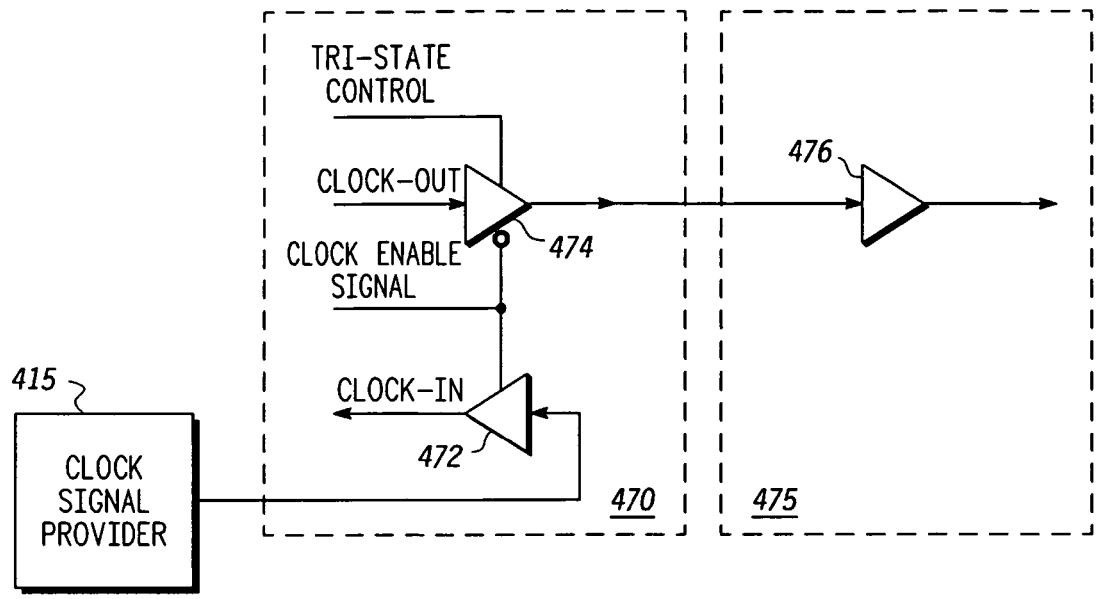
FIG. 5 illustrates clock line interfaces according to an embodiment of the invention.

The media access controller 410 and the first component 421 have various interfaces such as interfaces 460', 470, 465 and 475 that are further illustrated in FIG. 3-FIG. 5.

Figure 2:
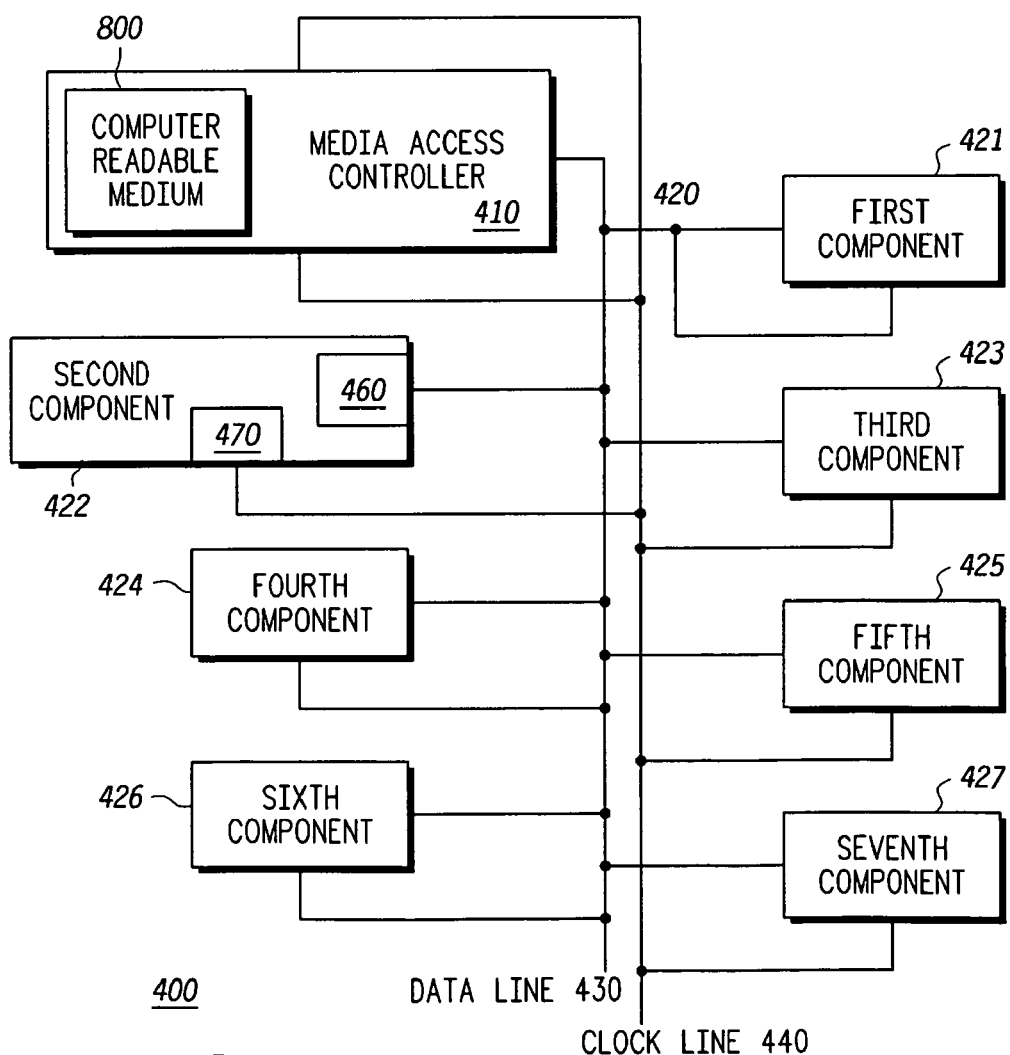
FIG. 2 illustrates a device according to another embodiment of the invention.

FIG. 2 illustrates a device 400 according to another embodiment of the invention. Device 400 differs from device 400' by including multiple components 422-427. For convenience of explanation FIG. 2 illustrates seven components (collectively denoted 420) in addition to the media access controller 410.

Each component has two interfaces, but for convenience of explanation only the interfaces of second component 422 are shown. FIG. 3-FIG. 5 illustrates in further details these interfaces.

Conveniently, some of the components operate as masters while other components operate as slaves. Typically, the amount of slaves equals the amount of masters, but this is not necessarily so. The media access controller 410 can be regarded as a master, but this is not necessarily so.

It is noted that some of these components can be included within a single integrated circuit, but this is not necessarily so.

Conveniently, at least one component out of components 420 is a power management component.

Conveniently, a master can send commands (instructions) as well as data to a slave while a slave can send data to its master. A component can also send an interrupt request via the data bus.

According to an embodiment of the invention device 400 includes multiple components such as two power management integrated circuits, a graphic processing unit, and a base-band integrated circuit. The base-band integrated circuit includes a media access controller 410 and an application processor. Conveniently, the first power management controller is a slave of the base-band integrated circuit while the second power management integrated circuit is a slave of the graphic processing unit.

The components 420 and the media access controller 410 are connected to each other by a single data line 430 and by a single clock line 440.

The power consumption associated with data transfer over the data line 430 is responsive to the clock frequency of the clock signal provided over the clock line 440.

Typically each component, as well as the media access controller 410 includes a certain portion (such as the interfaces illustrated in FIG. 3-FIG. 5) that is fed by the clock signal that is provided over clock line 440. The power consumption of that portion can be reduced by providing a low frequency clock signal over the clock line or by not providing a clock signal over the clock line 440. The selective provision of clock signal is also known as clock gating.

According to an embodiment of the invention other portions of the components 420 can operate at various power modes, regardless to the clock signal provided over the clock line 440 or in response to that clock signal. Conveniently, each component receives clock signals from two or more sources, one being the clock line 440.

The media access controller 410 is capable of operating during low power modes when it does not provide a clock signal over the clock line 440. For example, it is capable of monitoring the data line 430 in order to determine whether one or more components out of multiple components 420 requests to transmit information over the data bus 430. The media access controller 410 can also determine to initiate a transmission sequence during which it (the media access controller 410) transmits information to one or more of components 420.

Conveniently, the media access controller 410 can access a set of instructions that are at least partially stored within a computer readable medium 800, such as a memory unit. The memory unit can be an internal memory unit, an external memory unit, a cache memory or not.

According to an embodiment of the invention the media access controller 420 also operates as a clock signal generator. FIG. 3 illustrates a clock signal generator 415 that is included within the media access controller 410. It is noted that this is not necessarily so and the media access control 410 can control another component (such as a remote clock signal generator) that selectively provides the clock signal.

The media access controller 410 can receive a clock signal from another source and selectively provide this clock signal to the clock line 440. Such a configuration is illustrated in FIG. 5.

Conveniently, the media access controller 410 is adapted to (i) monitor the data line 430, while maintaining at least a clock line in a low power mode, (ii) detect at least one media access request generated by at least one component out of multiple components 420, (iii) force the at least clock line to exit the low power mode and start a contention prevention period, in response to at least one detected media access request or in response to a determination to transmit information by the media access controller itself.

If the media access controller 410 determines that one of components 420 should access the data line 430 then it also generates at least one media access grant.

Conveniently, the media access controller 410 or a clock signal provider that is controlled by the media access controller 410 is adapted to provide a high frequency clock signal over the data line and further adapted to determine, before a completion of the transmitting and in response to the transmitted information, when to substantially reduce the clock rate. The reduction can include not providing a clock signal.

For convenience of explanation each of devices 400 and 400' are referred to as device 400. Those of skill in the art will appreciate that due to the different amount of components within each device the communication protocol can differ (for example the amount of media access request and grant periods can vary). Each of methods 10, 100 and 300 can be conveniently executed by either one of devices 400 and 400'.

Conveniently device 400 has frame synchronization capabilities. The device 400 includes a clock signal provider 415 and multiple components 421-427 that are connectively denoted 420. The multiple components 420 are connected to a data line 430. The clock signal provider 415 is adapted to provide a high frequency clock signal over a clock line 440 during a transmission of information over the data line. At least one component out of the multiple components 420 is adapted to process at least one signal conveyed over the data line during a short synchronization period to determine a presence of a synchronization error. In addition, device 400 is adapted to maintain at least the clock line in a low power mode when the data line is substantially idle.

Conveniently, the media access controller 410 is adapted to selectively provide high frequency clock signals over the clock line and to selectively grant access to the data line. At least one component out of components 420 is adapted to perform frame synchronization during a short synchronization period, in response to a received short synchronization sequence.

Conveniently, information is transmitted over a single data line 440 at a transmission rate that can range between a very low frequency and a high frequency of few and even tenths of Mhz.

FIG. 3 illustrates data line interfaces 460 and 465, according to an embodiment of the invention.

The data interfaces 460 and 465 are connected to the data line 430. They are both bi-directional, although interface 460 belongs to a master component, while interface 465 belongs to a slave component.

Interface 460 includes an input buffer 462 and an output buffer 464. The output buffer 464 can receive data ("Data-in") from another portion of the master component and provide data ("Data-out") to the data line 430. The output buffer 464 is controlled by a tri-state signal and by a read/write signal. The tri-state signal can force the output buffer 464 to enter a high impedance state. The input of input buffer 462 is also connected to data line 430. The read/write control signal activates either the input buffer 462 or the output buffer 464.

The output of the output buffer 464 and the input of the input buffer 462 define an output node of the component.

Interface 465 includes an input buffer 466 and an output buffer 468. The output buffer 468 can receive data ("Data-in") from another circuit of the slave component and provide data ("Data-out") to the data line 430. It is controlled by a tri-state signal and by a read/write signal. The tri-state signal can force the output buffer 468 to enter a high impedance state. The input of input buffer 466 is also connected to data line 430. The read/write control signal activates either the input buffer 466 or the output buffer 468.

FIG. 4 illustrates a data line interface 460' of the media access controller 410, according to an embodiment of the invention.

The data line interface 460' differs from the data line interface 460 by having a pull down resistor 461 that is connected to the output node of the media access controller 410. Pull down resistor 461 can be included within the media access controller 410, but this is not necessarily so.

According to other embodiments of the invention at least one other component out of components 420 is also connected to (or includes) a pull down resistor.

According to yet further embodiments of the invention at least one other component out of components 420 and/or the media access controller 410 are connected to a pull up circuitry, instead to a pull up resistor 461. In this case a component can provide a low level signal to indicate that it requests to transmit over the data line.

FIG. 5 illustrates clock line interfaces 470 and 475 according to an embodiment of the invention.

Clock interface 470 belongs to the media access controller 410 and can include an output buffer 474 or a combination of an input and output buffers 472 and 474, as illustrated in FIG. 3. The input buffer 472 is conveniently connected, not through the clock line 440, to a clock signal generator 415 in order to receive a clock signal ("Clock-in"). The media access controller 410 selectively provides that signal to the clock line 440. The output buffer 474 receives a Clock-out signal that can be derived from the Clock-in signal.

Conveniently, the other components have an interface 475 that includes only an input buffer 476.

Figure 6:
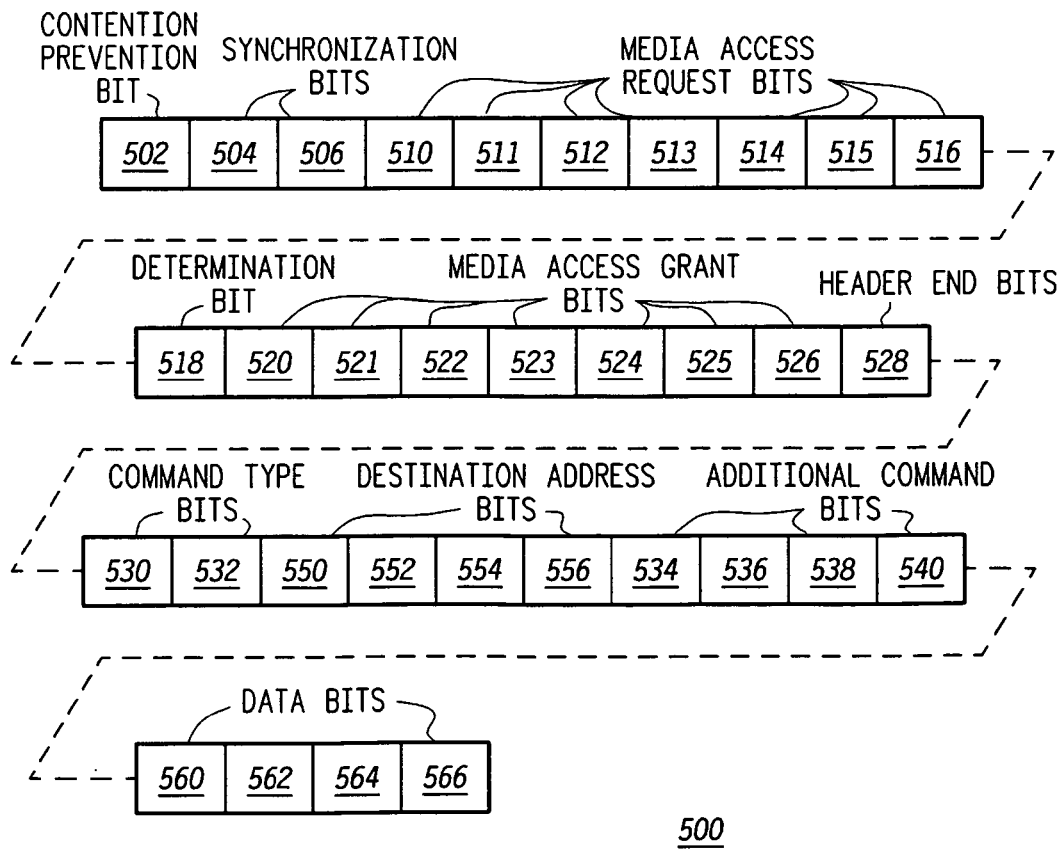
FIG. 6 illustrates an information frame, according to an embodiment of the invention.

FIG. 6 illustrates an information frame 500, according to an embodiment of the invention.

Conveniently, once the transmission of information frame 500 ends, the media access controller 410 stops the provision of the clock signal over clock line 440 and accordingly forces the clock line and circuitries that are clocked by that clock line to enter a low power mode.

The information frame 500 includes many portions. For convenience of explanation the following description associates lengths (clock cycles, amount of bits) to each portion. These lengths are non-limiting.

The information frame 500 starts by a contention prevention bit 502 during which the media access controller 410 enters a high impedance state.

Referring to the example set forth in FIG. 4 the output buffer 464 of the media access controller 410 enters a high impedance state while the pull down resistor 461 provides a pull down path to the data line 430.

Conveniently, if a component out of components 420 asserts the data line 430 to indicate that it requests to access the data line 430, then the media access controller 410 can still sense that request. Thus, contention prevention bit 502 prevents the simultaneous transmission by the media access controller 410 and a component out of components 420.

Thus, during a contention prevention period that is defined by the contention prevention bit, the data line can convey a low value ("0") signal (if the data line 430 is successfully pulled down by pull down resistor 461), convey a high value ("1") signal (if a component out of components 420 indicates that it requests to access the data line 430).

If the pull down resistor 461 pulls the data line 430 down while a components out of components 420 asserts an initial access request signal then the data line can enter a state that is not well defined. Usually, such a not-defined state can be eliminated by carefully selecting the value of the pull down resistor and the current of the initial access request signal.

The length of the contention prevention period is conveniently long enough to allow media access requests to be received by the media access controller 410 before it starts to transmit information over the data line 430.

Requests can be received during this contention prevention period for various reasons including a late recognition, by a component, that a clock signal is being provided over the clock line 440.

Conveniently, a component that issued an initial media access request by asserting a signal over data line 430 negates the signal over the data line 430 once it senses that the media access controller 410 starts to provide a clock signal over clock line 440. This component provides an additional request signal during a media access request period allocated to that component. It is noted that both initial and additional requests are also referred to as media access request.

The contention prevention bit 502 is followed by two synchronization bits 504 and 506. The value of bit 504 differs from the value of bit 506.

Conveniently, the components 421-427 count clock cycles in order to synchronize. A synchronization error can occur as a result of a missed clock cycle, or other errors associated with a counting based synchronization scheme.

Two synchronization bits of different values are required, as the value of the contention prevention bit 502 is not known in advance. The components 420 monitor the data line 430 in order to detect the change between the two synchronization bits 504 and 506.

Synchronization bit 506 is followed by media access request bits 510-516. Each bit is associated with a single component. Components 420 are configured to transmit a media access request over the data line during predefined media access request periods. Conveniently, the media access bits are ordered in response to the transmission priority of the components, but this is not necessarily so.

Conveniently, if the multiple components 420 include K components that can access the data line then K media access bits are required. K is a positive integer. K equals one in the configuration illustrated in FIG. 1. K equals seven in the configuration illustrated in FIG. 2.

It is further noted that in a configuration such as illustrated in FIG. 1 the media access controller 410 decides whether to access the bus of to allow the first component 421 to access the bus.

It is noted that a media access period during which each component can send a media access request signal can be longer than one bit. The length of the media access period is usually responsive to the propagation period of the request over the data line 430.

The media access request bits 510-516 are followed by a media access control determination period during which the media access controller determines who can access the data line 430. This determination period is represented by a determination bit 518.

Conveniently the output buffer 464 of the media access controller 410 enters a high impedance state during the determination period.

The media access controller 410 can use various prior art media access control schemes. The allocation can be based upon fixed priority allocated to the components, upon fairness based schemes, and the like. Various versions of the round robin arbitration scheme can be used. Conveniently, the media access control determination period is short, such as one clock cycle.

It is noted that the media access controller 410 is illustrated as performing media access control determination on a single information frame basis, but this is not necessarily so. According to another embodiment of the invention the media access method and device can perform a media access control sequence in order to determine the access of one or more components to the data line 430 during multiple transmission sessions.

Conveniently, the components are configured to be aware of their media access request period and media access grant period, as well as to the timing allowed to transmit information over the data line 430. A component needs to know that it has to wait a certain period (depending upon the order of the associated media access grant period) until he can start transmission. According to another embodiment of the invention a component can search for a header end sequence and just then start to transmit. A sequence of bits that includes at least one high level bit followed by a zero bit and then a sequence of high level bits can be used, especially if during the media access control grant bits only one bit is high while the others are low.

The determination bit 518 is followed by media access control grant bits 520-526. If the media access controller 410 determines that a certain component out of components 420 should access the data line 430 then it provides a grant signal during the corresponding media access control period.

The media access controller 410 can determine to block access to the data line 430 for its own use or for system considerations and in response does not send a grant signal to any 420 components.

The media access control grant bits 520-516 are followed by header end bit 528.

According to an embodiment of the invention an information frame end bit (or sequence) is transmitted, in addition to the header end bit 528 or instead of the header end bit 528.

The header is followed by at least one of the following: command bits, address bits, data bits. The order of said bits as well as the length of each bit sequence can vary. Some bit sequences can be transmitted during one transmission sequence, while other bit sequences can be transmitted during other transmission sequences. For example, data bits can be transmitted only when certain commands are being executed.

According to various embodiments of the invention some bit sequences can be transmitted by one component while other bit sequences can be transmitted by another component. For example, during a transmission sequence a master component can gain access to the data line 430, and then transmit a READ command to a slave component, the slave component then sends the requested data to the master component. This can occur even if the media access controller 410 did not grant access to the slave component.

It is assumed that the header end bit 528 is followed by command type bits 530 and 532, destination address bits 550-556, additional command bits 534-540, and data bits 560-566.

TABLE 1 illustrates exemplary commands, according to an embodiment of the invention. It is noted that many power management schemes that include multiple power modes can be applied by using the mentioned above device and information frames. For example, the amount of power modes can exceed two, the power management can be responsive to various parameters such as temperature, and the like.

It is noted that various commands including the MODE command can be user defined. The MODE command conveniently initiates an execution of predefined instructions and/or initiate the retrieval of predefined values. A single MODE command is conveniently associated with settings that otherwise require an exchange of many instructions between various components.

The row "AD" of TABLE 1 indicates whether the component that sends the command also sends data.

The row "DT" of TABLE 1 indicates whether the component that sends the command also sends an address of a destination component.

During the increase/decrease supply voltage/clock frequency commands the data (denoted Y*) can include an address of a register that has to be updated. The updating data can follow the command.

It is further noted that some of the commands can be follow by a response (conveyed over the data line 430) that indicates if the command was completed, and the like.

TABLE 1

| Command | Sub-command | Command Type bits | Additional command bits | AD | DT |
| --- | --- | --- | --- | --- | --- |
| Read | Read one byte of data | 00 | 000 | Y | N |
| Read | Read two byte of data | 00 | 001 | Y | N |
| Read | Read three bytes of data | 00 | 010 | Y | N |
| Read | Read four bytes of data | 00 | 011 | Y | N |
| Write | Write one byte of data | 00 | 100 | Y | Y |
| Write | Write two byte of data | 00 | 101 | Y | Y |
| Write | Write three bytes of data | 00 | 110 | Y | Y |
| Write | Write four bytes of data | 00 | 111 | Y | Y |
| Mode | Enter standby mode - reduce power consumption | 10 | 000 | N | N |
| Mode | Enter panic mode- increase | 10 | 001 | N | N |

TABLE 1-continued

| Command | Sub-command | Command Type bits | Additional command bits | AD | DT |
|---|---|---|---|---|---|
| | voltage to a high level | | | | |
| DVS | Sets a certain voltage regulator to a certain value | 11 | 0010 | | |
| Increase supply voltage/ clock frequency | Increase the content of a certain register such as to allow a predefined voltage and/or supply clock increment | 11 | 0011 | Y | Y* |
| Decrease supply voltage/ clock frequency | Decrease the content of a certain register such as to allow a predefined voltage and/or supply clock decrement | 11 | 0100 | Y | Y* |
| Identify data | Read identification value of a component | 11 | 1000 | Y | N |
| Link test | Request to receive a predefined value in order to test the device | 11 | 1110 | | |
| Sync. | Synchronize | 11 | 1111 | | |

Figure 7:
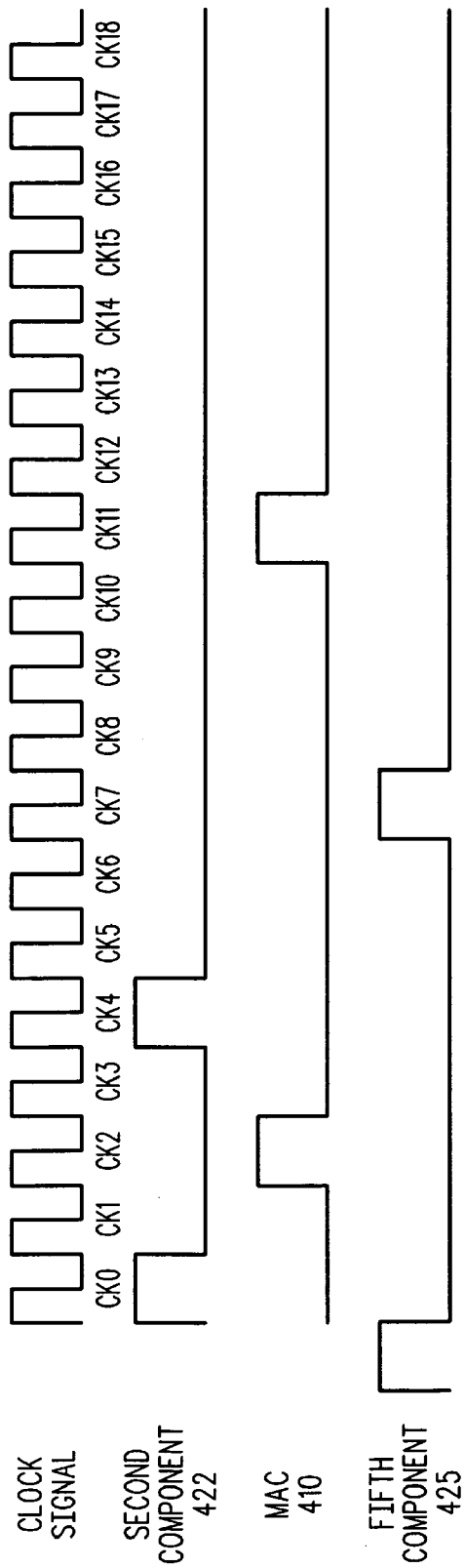
FIGS. 7-8 illustrate an exemplary execution session of an Identify data command, according to an embodiment of the invention.
Figure 8:
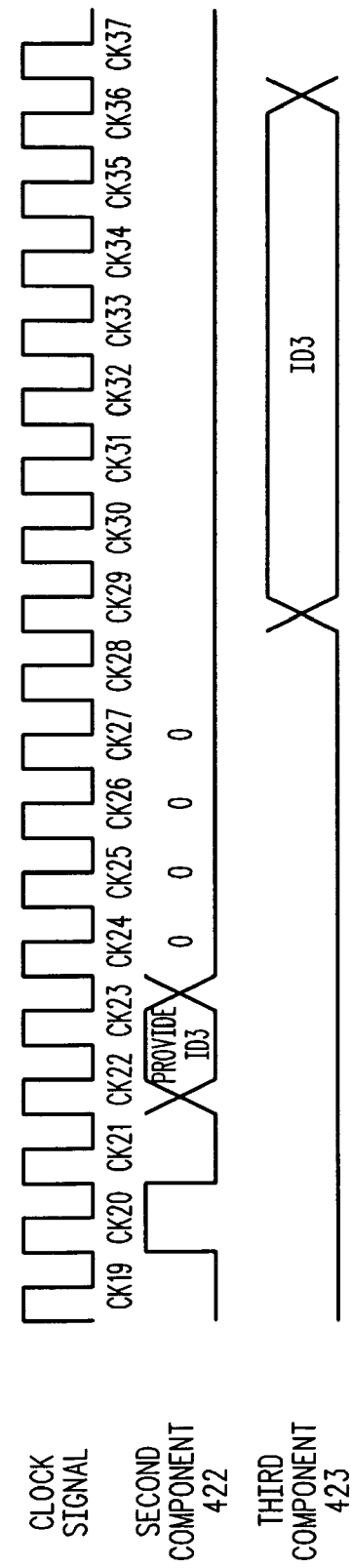

FIGS. 7-8 and TABLE 2 illustrate an exemplary execution session of an Identify data command, according to an embodiment of the invention. A second component 422 requests to access the data line 430 in order to receive an identification information (ID3) of a third component 423. The second component 422 sends an initial media access request during the contention prevention period. It is further assumed that a fifth component 425 also requests to access the data line 430 but it has a lower priority than the second component 422. The fifth component 425 sends an initial media access request that initiates the provision of clock cycles by the media access controller 410.

TABLE 2

| Clock cycle | Transmitted signal | Transmitting component |
|---|---|---|
| CK0 | Initial request to access media | Second component 422 |
| CK1-CK2 | Synchronization bits | MAC |
| CK3 | Nothing | First component 421 does not request access to the data line |
| CK4 | Media access request | Second component 422 requests to access the data line |
| CK5-CK6 | Nothing | Third and fourth components 423 and 424 do not request access to the data line |
| CK7 | Media access request | Fifth component 425 requests to access the data line |

TABLE 2-continued

| Clock cycle | Transmitted signal | Transmitting component |
|---|---|---|
| CK8-CK9 | Nothing | Sixth till seventh component 426-427 do not request to access the data line |
| CK10 | Nothing (High impedance determination bit) | MAC performs media access control determination |
| CK11 | Nothing | MAC does not grant access to first component 421 |
| CK12 | Media access grant | MAC grants access to second component 422 |
| CK13-CK18 | nothing | MAC does not grant access to third till seventh components 423-427 |
| CK19 | Header end bit 528 | MAC |
| CK20-CK21 | Command type bits = 10 | Second component 422 |
| CK22-CK23 | Third component's address (ID3) | Second component 422 |
| CK24-CK27 | Additional command bits = 0000 | Second component 422 |
| CK28 | Nothing | Spacer bit |
| CK29-CK36 | ID3 | Third component 423 provides its identification value ID3 |
| CK37 | No clock cycle | Clock line idles till next transmission sequence |

Figure 9:
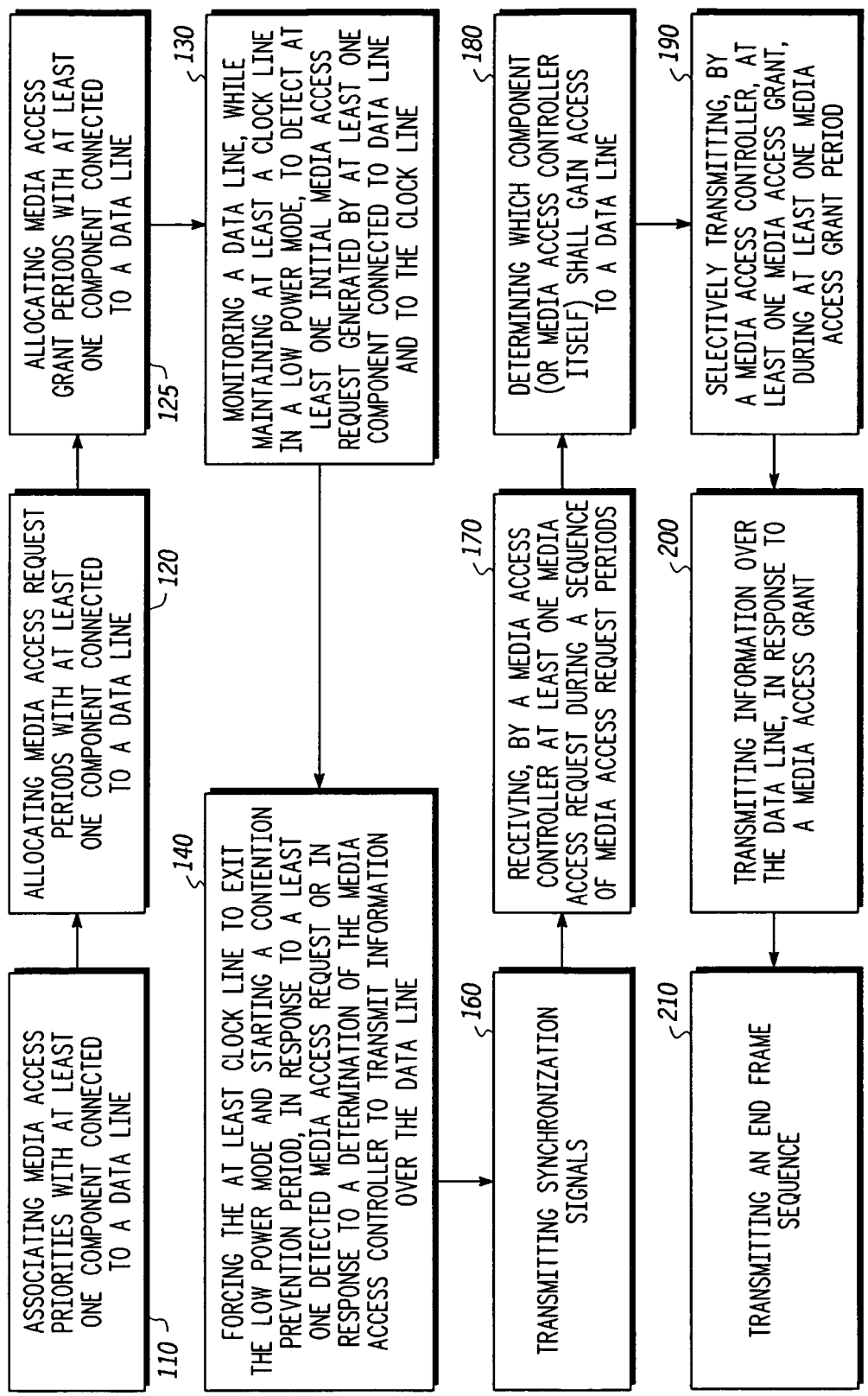
FIG. 9 illustrates a method for media access control, according to an embodiment of the invention.
Figure 10:
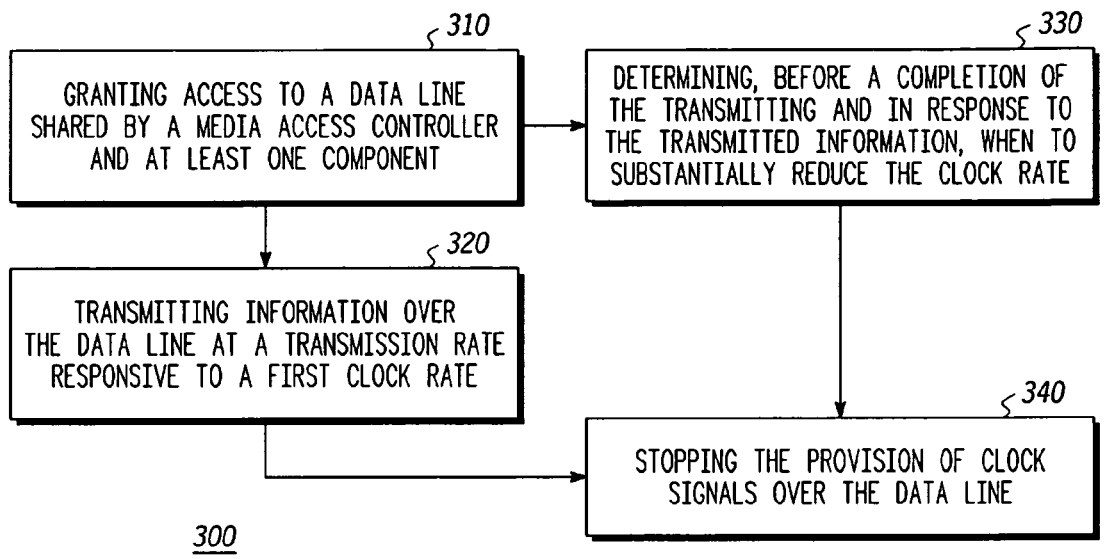
FIG. 10 is a flow chart of a method for exchanging signals over a data line, according to an embodiment of the invention.
Figure 11:
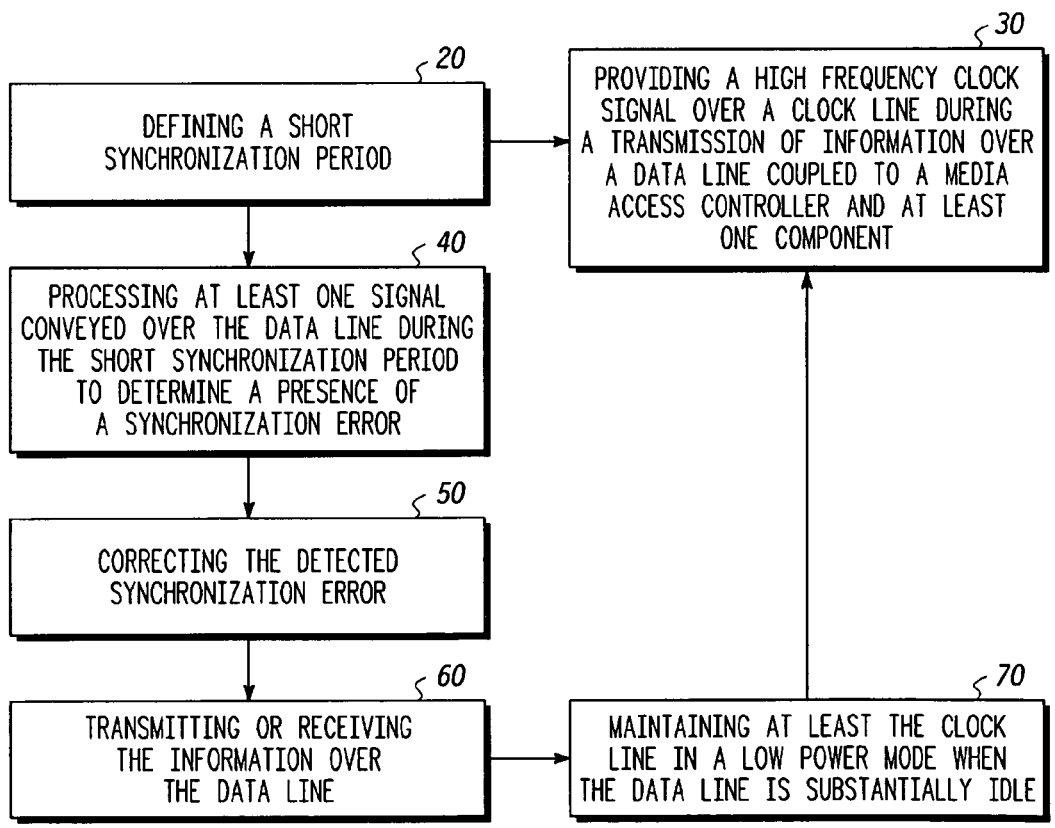
FIG. 11 is a flow chart of a method for media access control, according to an embodiment of the invention.

In reference to the flow charts illustrated in FIG. 9, FIG. 10 and FIG. 11 it is noted that some of the following stages are optional, and other stages can be added to the method, without departing from the spirit of the invention. For convenience of explanation the various stages are illustrated in view of the examples illustrated in previous figures. These explanations are not intended to limit the scope of the illustrated method.

FIG. 9 is a flow chart of a method 100 for media access control, according to an embodiment of the invention.

According to an embodiment of the invention multiple components are connected to the data line 430 and to the clock line 440 in addition to the media access controller 410. For simplicity of explanation the following explanation refers to a multiple component configuration.

Method 100 starts by stage 110 of associating media access priorities with at least one component connected to the data line. These associations can be performed in advance, can be fixed an/or can be dynamically changed.

Stage 110 is followed by stage 120 of allocating media access request periods with at least one component connected to the data line. The allocation allows the media access controller to determine which component issued a media access request.

Stage 120 is followed by stage 125 of allocating media access grant periods to components connected to the data line.

Stage 125 is followed by a sequence of stages that repeated during the operation of the media access controller 410.

The sequence starts by stage 130 of monitoring data line 430, while maintaining at least a clock line in a low power mode, to detect at least one initial media access request generated by at least one component connected to the data line and to the clock line.

Conveniently a clock signal is not provided over clock line 440 during stage 130. Conveniently, the component is one out of multiple components connected to the data line, other than the media access controller.

Stage 130 is followed by stage 140 of forcing the at least clock line to exit the low power mode and starting a contention prevention period, in response to at least one detected media access request or in response to a determination of the media access controller 410 to transmit information over the data line.

Conveniently the media access controller 410 or a clock signal provider 415 that is controlled by the media access controller, provides a clock signal during stages 140-210.

Conveniently, the media access controller 410 does not transmit information during the contention prevention period. According to an embodiment of the invention an output buffer 464 of the media access controller 410 enters a high impedance state while a pull down transistor 461 provides a pull down path to the ground.

Conveniently, the contention prevention period is one clock cycle long.

Once the contention prevention period ends the method enters a synchronization period that includes transmitting synchronization signals, as illustrated by stage 160. Conveniently, the synchronization signals include at least one bit of a first value that is followed by at least one bit of another value.

Stage 160 is followed by stage 170 of receiving, by a media access controller 410, at least one media access request during a sequence of media access request periods. Conveniently, each media access request period is associated with a component connected to the data line. It is noted that if the media access controller 410 determines to transmit data then stages 170 and 190 are not necessarily executed.

Stage 170 is followed by stage 180 of determining which component (or media access controller 410 itself) shall gain access to the data line 430. The determination is usually responsive to a reception of at least one media access request.

Stage 180 is followed by stage 190 of transmitting, by a media access controller 410, at least one media access grant, during at least one media access grant period. Conveniently, each media access grant period is associated with a component connected to the data line. If the media access controller 410 decides to access the data line 410 it does not provide any media access grant. It is noted that various media access grant schemes can be used. For example, the media access controller 410 can transmit, during a one or more media access grant periods a coded number representing the number (identity) of the selected device. Referring to the example set forth in FIG. 2, a three bit code can be used to identify either one of components 421-427.

Stage 190 is followed by stage 200 of transmitting information over the data line, in response to a media access grant. The information can include data, command, address or a combination thereof. Typically, data bits are preceded by command bits and address bits.

Conveniently the transmitted information includes power control information. The power control information can include power control commands as well as power control data. The commands can include for example, a request to increase (or decrease) the supplied power (and/or a supply clock cycle rate), a request to read a certain value indicative of the power consumption, and the like. These values can reflect the temperature of the components, the supply clock frequency supplied to the components 420, the voltage supplied to the components 420 and the like.

The supply clock signal conveniently differs from the clock signal supplied over clock line 440. The supply clock signal usually clocks portions of the components that do not participate in the data exchange over the data line 440.

Stage 200 is followed by stage 210 of transmitting an end frame sequence. Stage 210 is followed by stage 130. The end frame sequence can be transmitted instead of a frame header end sequence or in addition to said frame header end sequence.

FIG. 10 is a flow chart of a method 300 for exchanging signals over a data line, according to an embodiment of the invention.

Method 300 starts by stage 310 of granting access to a data line shared by multiple components. Conveniently, stage 310 includes monitoring the data line to detect one or more requests to access the data line, and in response increasing the clock rate. Conveniently, stage 310 can include one or more stages out of stages 110-190 of method 100.

Stage 310 is followed by stage 320 and 330. Stage 320 includes transmitting information over the data line at a transmission rate responsive to a first clock rate.

Stage 330 includes determining, before a completion of the transmitting and in response to the transmitted information, when to substantially reduce the clock rate.

Stages 320 and 330 are followed by stage 340 of stopping the provision of clock signals over the clock line. Stage 340 is followed by stage 310.

FIG. 11 is a flow chart of a method 10 for media access control, according to an embodiment of the invention.

Method 10 starts by stage 20 defining a short synchronization period. Conveniently, the short synchronization period is defined in response to a maximal expected synchronization error. According to an embodiment of the invention a maximal expected synchronization error is N clock cycles long and the short synchronization period does not exceed (N+1) clock cycles.

Stage 20 is followed by stages 30 and 40. Stage 30 includes providing a high frequency clock signal over a clock line during a transmission of information over a data line that is conveniently connected to the media access controller and to at least one other component. Stage 30 is followed by stage 70. Conveniently, the high frequency exceeds 10 Mhz. It can reach 25 Mhz and even more.

Stage 40 includes processing at least one signal conveyed over the data line during the short synchronization period to determine a presence of a synchronization error. The at least one signal can define a synchronization sequence. It is noted that at least a part of that sequence can be transmitted during the short synchronization period. Conveniently, the synchronization sequence includes at least one bit of a first value followed by at least one bit of a different value.

If a synchronization error is detected then stage 40 is followed by stage 50 of correcting the detected synchronization error. Stage 50 is followed by stage 60 of transmitting information over the data line or receiving information over the data line.

Stage 60 is followed by stage 70 of maintaining at least the clock line in a low power mode when the data line is substantially idle.

Figure 12:
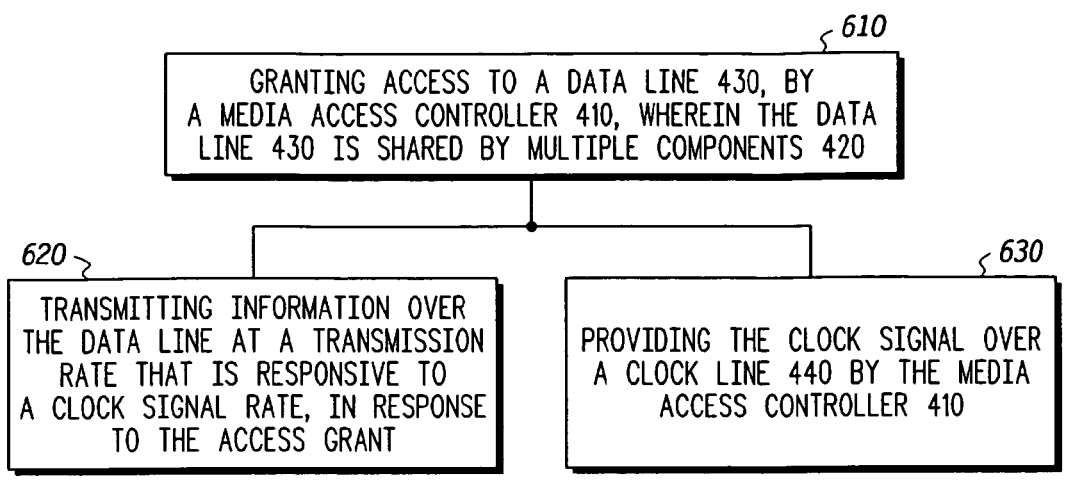
FIG. 12 a flow chart of a method for exchanging signals over a data line, according to an embodiment of the invention.

FIG. 12 a flow chart of a method 600 for exchanging signals over a data line, according to an embodiment of the invention.

Method 600 starts by stage 610 of granting 610 access to a data line 430, by a media access controller 410, wherein the data line 430 is shared by multiple components 420.

Stage 610 is followed by stages 620 and 630. Stage 620 includes transmitting information over the data line at a transmission rate that is responsive to a clock signal rate, in response to the access grant.

Stage 630 includes providing the clock signal over a clock line 440 by the media access controller 410.

Conveniently, stage 610 includes monitoring the data line 430 to detect a request to access the data line 430, and in response increase the clock signal rate.

Figure 13:
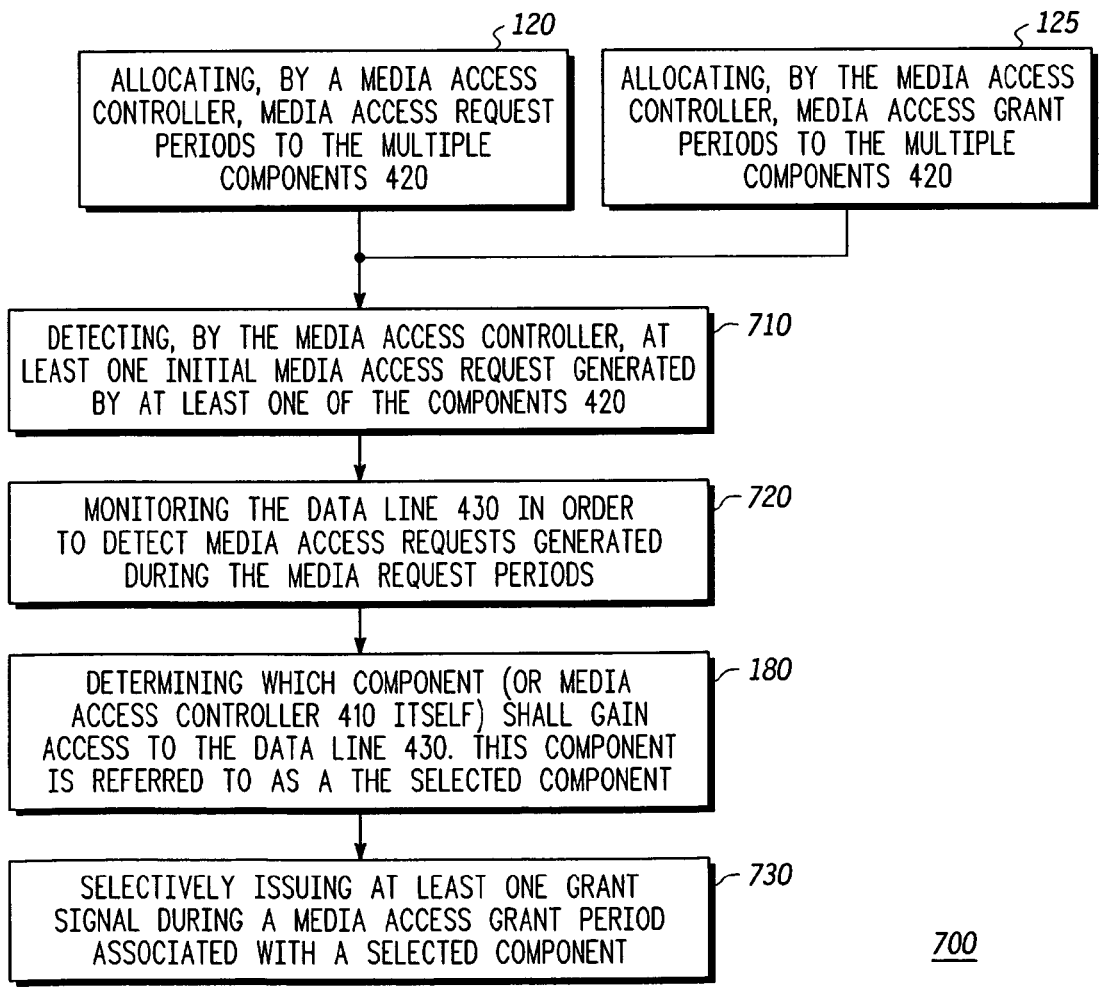
FIG. 13 is a flow chart of a method for media access control, according to an embodiment of the invention.

FIG. 13 is a flow chart of a method 700 for media access control, according to an embodiment of the invention.

The method 700 can be used to grant access to a data bus 430 that is shared by multiple components 420 and a media access controller 410.

Method 700 includes preliminary stages 120 and 125. Stage 120 includes allocating, by a media access controller, media access request periods to the multiple components 420. Stage 125 includes allocating, by the media access controller, media access grant periods to the multiple components 420.

Stages 120 and 125 are followed by a sequence of stages that can be repeated for each media access control cycle.

The sequence starts by stage 710 of detecting, by the media access controller, at least one initial media access request generated by at least one of the components 420. Stage 710 may include stages 130 and even stage 140.

Stage 710 is followed by stage 720 of monitoring the data line 430 in order to detect media access requests generated during the media access request periods.

Stage 720 is followed by stage 180 of determining which component (or media access controller 410 itself) shall gain access to the data line 430. This components is referred to as the selected component.

Stage 180 is followed by stage 730 of selectively issuing at least one grant signal during a media access grant period associated with a selected component. The grant signal is responsive to the determination of stage 180.

Conveniently, the media access request periods form a continuous sequence of media access request periods.

Conveniently, the media access grant periods form a continuous sequence of media access grant periods.

According to various embodiments of the invention each of the mentioned above methods (10, 100, 300, 600, 700) can be executed by a device or especially by a media access controller that executes a set of instructions that is stored within a computer readable medium 800. This medium is not necessarily an internal memory unit, as illustrated in FIG. 2. This medium can include magnetic storage devices (such as magnetic tape, diskettes, disk drives), optical storage devices (such as DVD, CD) and the like. The media access controller 410 can execute the method in cooperation with other components such as storage unit, buses and the like.

Conveniently, a computer readable medium is provided, having stored thereon a set of instructions. The set of instructions, when executed by a media access controller, cause the media access controller to grant access to a data line shared by the media access controller and at least one other component, such that a component transmits information over the data line at a transmission rate responsive to a first clock rate.

The set of instructions also cause the media access controller to determine, before a completion of the transmission and in response to the transmitted information, when to substantially reduce the clock rate.

Conveniently, a computer readable medium is provided, having stored thereon a set of instructions. The set of instructions, when executed by a media access controller, cause the media access controller to generate at least one media access grant in response to at least one media access request.

The set of instructions also cause the media access controller to monitor a data line, while maintaining at least a clock line in a low power mode, to detect at least one media access request generated by at least one component connected to the data line and to the clock line; and to force the at least clock line to exit the low power mode and starting a contention prevention period, when the media access controller or at least one component requests to access the data line.

Conveniently, a computer readable medium is provided, having stored thereon a set of instructions. The set of instructions, when executed by a media access controller, cause the media access controller to provide (or to control) a high frequency clock signal over a clock line during a transmission of information over a data line coupled to the media access controller and at least one component.

The set of instructions also cause the media access controller to process at least one signal conveyed over the data line during a short synchronization period to determine a presence of a synchronization error and maintain at least the clock line in a low power mode when the data line is substantially idle.

Conveniently, the set of instructions cause the media access controller 410 to grant access to a data line 430 wherein the data line 430 is shared by multiple components 420, and to provide a clock signal over a clock line 440 during a transmission of information over the data line at a transmission rate that is responsive to a clock signal rate.

Conveniently, the set of instructions cause the media access controller to determine which component shall gain access to a data line; to allocate media access request periods to the multiple components 420; to allocate media access grant periods to the multiple components 420; to detect at least one initial media access request generated by at least one of the components 420; to monitor the data line 430 to detect media access requests generated during the media access request periods; and to selectively issue at least one grant signal during a media access grant period associated with a selected component.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for frame synchronization, the method comprises:
   providing a high frequency clock signal over a clock line during a transmission of information over a data line coupled to a media access controller and at least one component;
   defining a short synchronization period, wherein the short synchronization period follows a contention prevention period to prevent simultaneous transmission by the media access controller and the at least one component;
   processing at least one signal conveyed over the data line during the short synchronization period to determine a presence of a synchronization error based on an error associated with the at least one signal conveyed over the data line; and
   maintaining at least the clock line in a low power mode when the data line is substantially idle.

2. The method according to claim 1 further comprising correcting a detected synchronization error.

3. The method according to claim 1, further comprising granting access to the data line.

4. The method according to claim 1, wherein the short synchronization period is defined in response to a maximal expected synchronization error.

5. The method according to claim 1, wherein a maximal expected synchronization error is N clock cycles long and wherein the short synchronization period does not exceed N+1 clock cycles.

6. The method according to claim 1, wherein at least one master component and at least one slave component are coupled to the data line.

7. The method according to claim 1, wherein at least one information frame comprises power control information.

8. The method according to claim 1, wherein the high frequency exceeds 10 Mhz.

9. The method according to claim 1, wherein a synchronization sequence to be at least partially transmitted during the short synchronization period comprises at least one bit of a first value followed by at least one bit of a different value.

10. A device having frame synchronization capabilities, the device comprise:
- a clock signal provider adapted to provide a high frequency clock signal over a clock line during a transmission of information over a data line; and
- at least one component, coupled to the clock line and to the data line, that is adapted to process at least one signal conveyed over the data line during a short synchronization period to determine a presence of a synchronization error based on an error associated with the at least one signal conveyed over the data line, wherein the short synchronization period follows a contention prevention period to prevent simultaneous transmission by a media access controller and the at least one component; and
- wherein the device is adapted to maintain at least the clock line in a low power mode when the data line is substantially idle.

11. The device according to claim 10 wherein the at least one component is further adapted to correct a detected synchronization error.

12. The device according to claim 10, wherein the device is further adapted to grant access to the data line.

13. The device according to claim 10, wherein the device defines the short synchronization period in response to a maximal expected synchronization error.

14. The device according to claim 10, wherein a maximal expected synchronization error is N clock cycles long and wherein the short synchronization period does not exceed N+1 clock cycles.

15. The device according to claim 10, wherein the at least one component comprises at least one master component and at least one slave component.

16. The device according to claim 10, wherein at least one information frame comprises power control information.

17. The device according to claim 10, wherein the high frequency exceeds 10 Mhz.

18. A device comprising:
- a data line and a clock line that are coupled to a media access controller and at least one component;
- the media access controller that is further adapted to selectively provide high frequency clock signals over the clock line and to selectively grant access to the data line; and
- wherein the at least one component is adapted to process at least one signal conveyed over the data line during a short synchronization period to determine a presence of a synchronization error based on an error associated with the at least one signal conveyed over the data line, and to perform frame synchronization during the short synchronization period, in response to a received short synchronization sequence, wherein the short synchronization period follows a contention prevention period to prevent simultaneous transmission by the media access controller and the at least one component.

19. The device according to claim 18 wherein the at least one component is further adapted to correct a detected synchronization error.

20. The device according to claim 18, wherein the device is further adapted to grant access to the data line.

21. The device according to claim 18, wherein the device defines the short synchronization period in response to a maximal expected synchronization error.

* * * * *